United States Patent [19]

Jinzaki et al.

[11] Patent Number: 5,404,134

[45] Date of Patent: Apr. 4, 1995

[54] SYSTEM FOR CARRYING OUT CONNECTION MANAGEMENT CONTROL OF RING NETWORK

[75] Inventors: Akira Jinzaki, Yamato; Masahiro Higuchi, Kawasaki, both of Japan

[73] Assignee: Fujitsu Limited, Kawasaki, Japan

[21] Appl. No.: 87,087

[22] Filed: Jul. 7, 1993

Related U.S. Application Data

[63] Continuation of Ser. No. 733,080, Jul. 19, 1991, abandoned, which is a continuation of Ser. No. 282,508, Dec. 12, 1988, abandoned.

[30] Foreign Application Priority Data

Dec. 11, 1987 [JP] Japan ................ 62-312315

[51] Int. Cl.$^6$ .............................................. H04Q 3/00
[52] U.S. Cl. ...................... 340/825.05; 370/85.5
[58] Field of Search ................................ 370/85-90, 370/85.1, 85.4, 85.5, 85.12, 85.15, 16, 16.1; 371/3, 7, 11.1; 340/825.05, 825.07, 825.08, 827

[56] References Cited

U.S. PATENT DOCUMENTS

| | | | |
|---|---|---|---|
| 4,495,493 | 1/1985 | Segarra et al. | 370/86 X |
| 4,495,595 | 1/1985 | Nakayashiki et al. | 340/825.05 X |
| 4,498,082 | 2/1985 | Aldridge et al. | 340/825.05 X |
| 4,506,360 | 3/1985 | Kryskow, Jr. et al. | 370/85 |
| 4,507,777 | 3/1985 | Tucker et al. | 370/86 X |
| 4,759,015 | 7/1988 | Takai et al. | 370/86 |
| 4,847,610 | 7/1989 | Ozawa et al. | 340/825.05 |

FOREIGN PATENT DOCUMENTS 0150907  7/1985  European Pat. Off. .

OTHER PUBLICATIONS

T. W. Madron, "Local Area Networks", Hayden Book Company, 1984, p. 43.
ANSI/IEEE Std 802.5-1985 ISO/DP 8802/5, American National Standard Local Area Networks 8025, ANSI/IEEE Standard ISO Draft Proposal, Token Ring Access Method (Mar., 1985).
X3T9/85-X3T9.5/84-49 REV-4.0, FDDI Station Management (SMT), Draft Proposed American National Standard Aug. 1, 1988.
European Search Report completed May 9, 1991 by Examiner Mikkelsen, C. at The Hague.
Jeffrey W. Reedy, The TDM Ring-A Fiber Optic Transport System for Campus or Metropolitan Networks, I.E.E.E. Journal on Selected Areas in Communications SAC-4 (1986) Dec., No. 9, N.Y., USA.
Floyd E. Ross, "FDDI-an Overview", I.E.E.E. 1987 pp. 434-440.

Primary Examiner—Ulysses Weldon
Attorney, Agent, or Firm—Staas & Halsey

[57] ABSTRACT

At least three control patterns are used for a connection management control of nodes in a ring network, each node determining a changeable communication status in accordance with a communication status of the own node and the nature of the control pattern received from an upstream node. The own node transmits one of the control patterns, selected in accordance with the changes in the communication status, to the downstream node. The control patterns indicate respective conditions of the own node so that the communication enable status of the ring network, as a whole, can be autonomously established by the nodes per se without employing a monitor node or supervisory node.

23 Claims, 15 Drawing Sheets

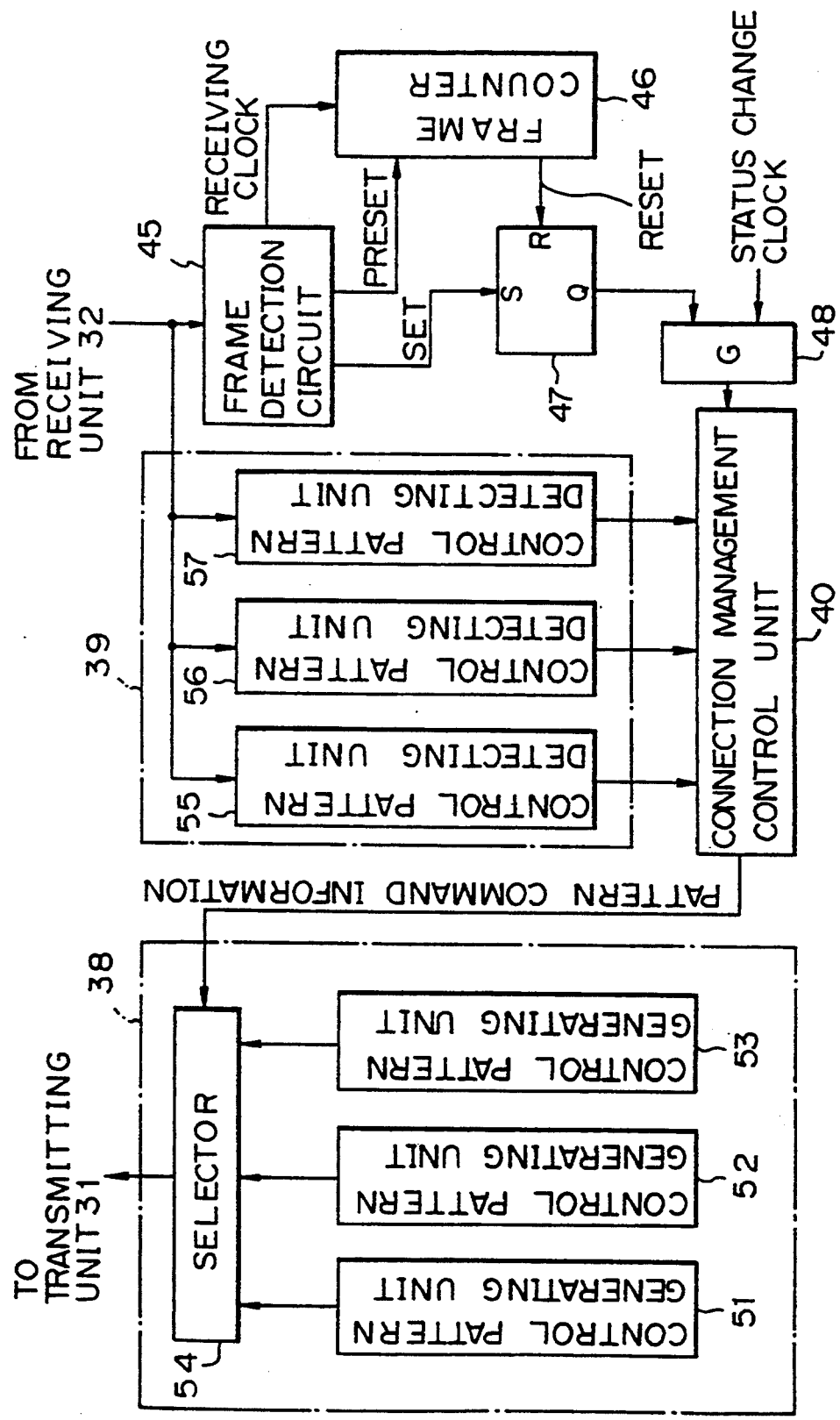

Fig. 9

| COMMUNI-CATION STATUS | MODE OF STATUS | TRANSMITT-ING PATTERN | RECEIVING PATTERN | NEXT STATUS |
|---|---|---|---|---|
| S1 | OWN NODE IS IN NORMAL STATUS | CP1 | CP1 CP2 | S2 |
| | | | CP3 | S9 |
| S2 | UPSTREAM NODE IS IN NORMAL STATUS | CP2 | CP1 | S1 |
| | | | CP2 | S3 |
| | | | CP3 | S9 |
| S3 | CONNECTION CONFIRMING STATUS | CP2 | CP1 | S1 |
| | | | CP2 | S4 |
| | | | CP3 | S9 |
| S4 | CONNECTION STATUS | CP2 | CP1 | S2 |
| | | | CP2 | NOT CHANGED |
| | | | CP3 | S9 |
| S5 | ABNORMALITY DETECTION STATUS | CP3 | NOT RECEIVED | S6 |
| S6 | ABNORMALITY STATUS | CP1 | CP1 | S7 |
| | | | RECEPTION ERROR CP2 CP3 | NOT CHANGED |
| S7 | ABNORMALITY RESTORATION STATUS 1 | CP2 | CP1 CP2 CP3 | S8 |
| S8 | ABNORMALITY RESTORATION STATUS 2 | CP2 | CP1 CP2 CP3 | S2 |
| S9 | ABNORMALITY WARNING STATUS | CP3 | CP1 CP2 | S1 |

Fig. 12

| TERM | N6 | N5 | N4 | N3 | N2 | N1 | N7 |
|---|---|---|---|---|---|---|---|
| POWER ON | — | — | — | — | — | — | — |
| 1 T | CP1·S1 | CP1·S1 | CP1·S1 | CP1·S1 | CP1·S1 | CP1·S1 | CP1·S1 |
| 2 T | CP2·S2 | CP2·S2 | CP2·S2 | CP2·S2 | CP2·S2 | CP2·S2 | CP2·S2 |
| 3 T | CP2·S3 | CP2·S3 | CP2·S3 | CP2·S3 | CP2·S3 | CP2·S3 | CP2·S3 |
| 4 T COMPLETION OF CONNECTION | CP2·S4 | CP2·S4 | CP2·S4 | CP2·S4 | CP2·S4 | CP2·S4 | CP2·S4 |
| | CP2·S4 | CP2·S4 | CP2·S4 | CP2·S4 | CP2·S4 | CP2·S4 | CP2·S4 |

Fig. 13

| TERM | N6 | N5 | N4 | N3 | N2 | N1 | N7 ← ABNORMALITY |
|---|---|---|---|---|---|---|---|
| ABNORMALITY | | | | | | | |
| 1T | CP2·S4 | CP2·S4 | CP2·S4 | CP2·S4 | CP2·S4 | CP2·S4 | CP2·S4×CP2·S4 |
| 2T | CP2·S4 | CP2·S4 | CP2·S4 | CP2·S4 | CP2·S4 | CP2·S4 | CP3·S5×CP2·S4 |
| 3T | CP2·S4 | CP2·S4 | CP2·S4 | CP2·S4 | CP2·S4 | CP3·S9 | CP1·S6×CP2·S4 |
| 4T | CP2·S4 | CP2·S4 | CP2·S4 | CP2·S4 | CP3·S9 | CP1·S1 | CP1·S6×CP2·S4 |
| 5T | CP2·S4 | CP2·S4 | CP2·S4 | CP3·S9 | CP1·S1 | CP2·S2 | CP1·S6×CP2·S4 |
| 6T | CP3·S9 | CP3·S9 | CP3·S9 | CP1·S1 | CP2·S2 | CP1·S1 | CP1·S6×CP2·S4 |
| 7T STOP WORKING | CP1·S1 | CP1·S1 | CP1·S1 | CP2·S2 | CP1·S1 | CP2·S2 | CP1·S6×CP3·S9 |
| | CP2·S2 | CP2·S2 | CP2·S2 | CP1·S1 | CP2·S2 | CP1·S1 | CP1·S6×CP1·S1 |
| REPEAT HEREAFTER | CP1·S1 | CP1·S1 | CP1·S1 | CP2·S2 | CP1·S1 | CP2·S2 | CP1·S6×CP2·S2 |
| | CP2·S2 | CP2·S2 | CP2·S2 | CP1·S1 | CP2·S2 | CP1·S1 | CP1·S6×CP1·S1 |

Fig. 14

| TERM | N6 | N5 | N4 | N3 | N2 | N1 | N7 |
|---|---|---|---|---|---|---|---|
| ABNORMALITY | CP2·S2 | CP1·S1 | CP2·S1 | CP1·S1 | CP2·S2 | CP1·S1 | CP1·S6×CP1·S1 |
| ABNORMALITY | CP1·S1 | CP2·S2 | CP1·S1 | CP2·S2 | CP1·S1 | CP1·S6×CP2·S2 |
| RESTORATION | CP2·S2 | CP1·S1 | CP2·S2 | CP1·S1 | CP2·S2 | CP1·S1 | CP1·S6○CP1·S1 |
| 1 T | CP1·S1 | CP2·S2 | CP1·S1 | CP2·S2 | CP1·S1 | CP2·S2 | CP2·S7○CP2·S2 |
| 2 T | CP2·S2 | CP1·S1 | CP2·S2 | CP1·S1 | CP2·S2 | CP1·S1 | CP2·S8○CP1·S1 |
| 3 T | CP1·S1 | CP2·S2 | CP1·S1 | CP2·S2 | CP2·S3 | CP2·S2 | CP2·S2○CP2·S2 |
| 4 T | CP2·S2 | CP1·S1 | CP2·S2 | CP2·S3 | CP2·S4 | CP2·S3 | CP2·S3○CP1·S1 |
| 5 T | CP1·S1 | CP2·S2 | CP2·S3 | CP2·S4 | CP2·S4 | CP1·S1 | CP1·S1○CP2·S2 |
| 6 T | CP2·S2 | CP2·S3 | CP2·S4 | CP2·S4 | CP2·S4 | CP2·S2 | CP2·S2○CP1·S1 |
| 7 T | CP2·S3 | CP2·S4 | CP2·S4 | CP2·S4 | CP2·S3 | CP1·S1 | CP1·S1○CP2·S2 |
| 8 T | CP2·S4 | CP2·S4 | CP2·S4 | CP2·S3 | CP1·S1 | CP2·S2 | CP2·S2○CP2·S3 |
| 9 T | CP2·S4 | CP2·S4 | CP2·S4 | CP2·S3 | CP2·S3 | CP2·S3 | CP2·S3○CP2·S4 |
| 10 T | CP2·S4 | CP2·S4 | CP2·S3 | CP2·S4 | CP2·S4 | CP2·S4 | CP2·S4○CP2·S4 |
| 11 T RESTART | CP2·S4 | CP2·S4 | CP2·S4 | CP2·S4 | CP2·S4 | CP2·S4 | CP2·S4○CP2·S4 |
| WORKING | CP2·S4 | CP2·S4 | CP2·S4 | CP2·S4 | CP2·S4 | CP2·S4 | CP2·S4○CP2·S4 |

ABNORMALITY ↓

Fig. 15H
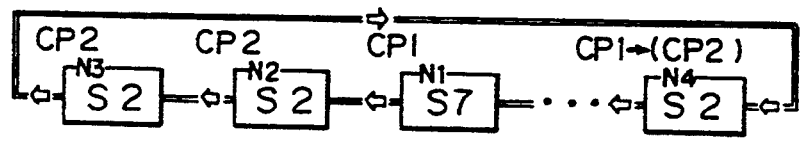
Fig. 15 I
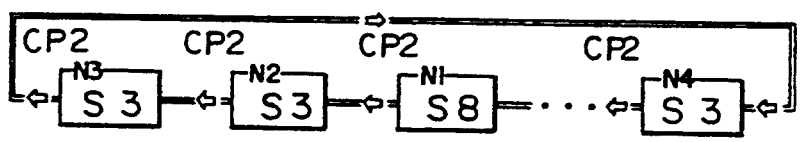
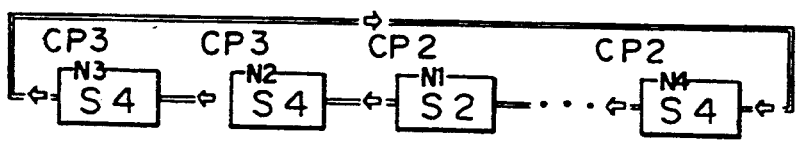
Fig. 15J
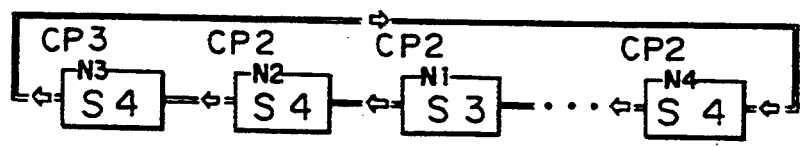
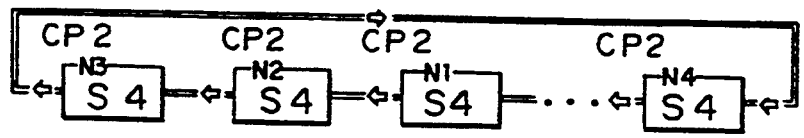

Fig. 16

| NO | TRANSMISSION CODES | SINGNIFICANCE |
|----|--------------------|---------------|
| 1  | 0 0 0 1 1 | UNUSED |
| 2  | 0 0 1 0 1 | DATA PATTERN 0 |
| 3  | 0 0 1 1 0 | DATA PATTERN 1 |
| 4  | 0 1 0 0 1 | DATA PATTERN 2 |
| 5  | 0 1 0 1 0 | DATA PATTERN 3 |
| 6  | 0 1 1 0 0 | DATA PATTERN 4 |
| 7  | 1 0 0 0 1 | DATA PATTERN 5 |
| 8  | 1 0 0 1 0 | CONTROL PATTERN (CP1) |
| 9  | 1 0 1 0 0 | DATA PATTERN 6 |
| 10 | 1 1 0 0 0 | CONTROL PATTERN (CP2) |
| 11 | 0 0 1 1 1 | DATA PATTERN 7 |
| 12 | 0 1 0 1 1 | DATA PATTERN 8 |
| 13 | 0 1 1 0 1 | DATA PATTERN 9 |
| 14 | 0 1 1 1 0 | DATA PATTERN 10 |
| 15 | 1 0 0 1 1 | DATA PATTERN 11 |
| 16 | 1 0 1 0 1 | DATA PATTERN 12 |
| 17 | 1 0 1 1 0 | DATA PATTERN 13 |
| 18 | 1 1 0 0 1 | DATA PATTERN 14 |
| 19 | 1 1 0 1 0 | CONTROL PATTERN (CP3) |
| 20 | 1 1 1 0 0 | DATA PATTERN 15 |
| 21 | 0 0 0 0 0 | FRAME DELIMITER PATTERN (FDP) |
| 22 | 0 0 0 0 1 | TOKEN PATTERN |

SYSTEM FOR CARRYING OUT CONNECTION MANAGEMENT CONTROL OF RING NETWORK

This application is a continuation of application Ser. No. 07/733,080, filed Jul. 19, 1991, now abandoned, which is a continuation of Ser. No. 07/282,508, filed Dec. 12, 1988, now abandoned.

BACKGROUND OF THE INVENTION

1. Field of the Invention

The present invention relates to a system for carrying out a connection management of a ring network which comprises a plurality of nodes connected in series via a ring line.

In the ring network, a connection management must be effectively performed for stopping the network operation when an abnormality occurs in the network and for restarting the network after the abnormality is eliminated, by determining whether the ring network is correctly formed as a ring through all of the nodes accommodated therein.

Specifically, the present invention refers to a ring network having a ring line, i.e., ring-form data transmission line. The present invention is preferably applied to a network having a single ring line, but as will be understood hereinafter, the present invention is also applicable to a ring network which, although having double ring lines, is often operated as a ring network having a single ring line. The single ring line connects a plurality of nodes, such as terminal stations, to realize a data transmission and reception thereamong. Each node is provided with at least one processor.

In general, the use of double ring lines increases the reliability of a ring network, but a single ring line is sufficient for some ring networks, such as a dispersed multiprocessor system. In such a multiprocessor system, there is little likelihood of damage to the transmission line, i.e., the ring line, compared with the probability thereof in a long distance data transmission system for intercity connections. Accordingly, a single ring line is preferable for such a dispersed multiprocessor system, from an economical view point, when setting up the same as a ring network. The present invention is preferably applied to a single ring line type network, for example, a dispersed multiprocessor system as mentioned above.

2. Description of the Related Art

Two systems for carrying out a connection management of the ring network accommodating a plurality of nodes are known, for example, a token ring system and a fiber distributed data interface (FDDI) system. The former token ring system by IEEE 802.5 is explained in, for example, "ANSI/IEEE Standard for Local Area Networks: Token Ring Access Method and Physical Layer Specifications, Apr. 29, 1985, 4. Token Ring Protocols" The latter FDDI system by ANSI is explained in, for example, "FDDI TOKEN RING STATION MANAGEMENT (SMT) DRAFT PROPOSED AMERICAN NATIONAL STANDARD X3T9.5, JUL. 25, 1985, 6. Connection Management"

These two known connection management systems will be explained hereinafter in more detail, but first the problems caused by these systems will be discussed.

The known token ring system carries out the connection management by turning a particular control frame around the ring network. Therefore, a detection of a fault, i.e., abnormality, and a recognition of an elimination of the abnormality is delayed by a term required for turning the particular control frame around the ring network. Accordingly, the larger the size of the ring network, the longer becomes the above-mentioned term or delay required for the detection of a fault and recognition of the elimination of the abnormality.

Further, when an abnormality occurs at a monitor node for realizing concentrated management of the ring network, complicated processing must be carried out, such processing includes software processing to enable one of the other normal modes to be used as a new monitor node. Accordingly, it is difficult to apply the token ring system per se to a ring network operated at a high speed of a transmission rate of over 100 Mb/s, due to an overload of the connection management.

Furthermore, each node of the ring network usually holds information regarding the scale of the network. Therefore, if the network is reconstructed due to, for example, the addition of new nodes, this information also must be renewed at the time of the above-mentioned reconstruction. For example, a timer value used for the detection of a fault and the recognition of the elimination of the abnormality, must be renewed to avoid this inconvenience. However it is possible not to renew the timer value by setting same to cope with the maximum expected scale of the network. Such a measure, however, causes a problem in that the above mentioned term for the fault detection and elimination recognition is unnecessary prolonged in a small scale network.

With regard to the known FDDI system, the connection management is carried out between each two adjacent nodes, and thus the system is equivalent to a dispersion control system. In such a FDDI system, it is not necessary to turn control data around the ring network as in the token ring system, and consequently, a high speed management is possible. Also, it is not necessary to form a monitor node as in the token ring system, and accordingly, the control of the FDDI system is simpler than the control of the token ring system.

In the token ring system, however, the system must be formed as a double ring network, and therefore, it is impossible to apply the connection management of the token ring system to the FDDI system as is. If a single ring network is partially formed under the FDDI system, the connection management for the part of the network constituting the single ring network is identical to the connection management of the token ring system, and accordingly, a problem similar to the aforesaid problem of the token ring system is raised.

SUMMARY OF THE INVENTION

Accordingly, an object of the present invention is to carry out a high speed connection management of a ring network with a simple hardware structure and simple control procedure. Specifically, in a single ring network, the term for reaching a communication enable status at each node is made short when power is supplied to the network and upon recognition of an elimination of an abnormal status of a node. Accordingly, a node places itself in a communication enable status when it has confirmed that at least two upstream nodes are in a normal status, this is achieved without using a monitor node or a supervisory node.

To realize the aforementioned object, at least three control patterns in the form of signals are introduced to a ring network, and each node forming the ring network includes therein a means for autonomously discriminating a communication status by using information indicating the communication status of the own node and information containing either of the control patterns sent from the upstream node, and determining whether or not a data communication is allowed. The information indicating the communication status of the own node is transmitted to the downstream node as control patterns; a first control pattern indicating that the own node is normal, a second control pattern indicating that both the own node and the upstream node are normal, and a third control pattern indicating that an abnormality has occurred.

BRIEF DESCRIPTION OF THE DRAWINGS

The above object and features of the present invention will be more apparent from the following description of the preferred embodiments with reference to the accompanying drawings, wherein:

FIG. 8 is a block diagram showing the main portion of the connection management unit illustrated in FIG. 7;

FIG. 9 depicts various modes of status changes exhibited in each node according to the present invention;

FIG. 12 depicts a time sequence for explaining a normal set up of a ring network;

FIG. 13 depicts a time sequence for explaining a case where an abnormality has occurred;

FIG. 14 depicts a time sequence for explaining a case where an abnormality is repaired and working restarted;

FIGS. 15A through 15J are diagrams of the ring network used for explaining the changes of both the status (S) and the control pattern (CP); and, FIG. 16 recites an example of transmission codes transferred on the digital ring line.

DESCRIPTION OF THE PREFERRED EMBODIMENTS

Before describing the embodiments of the present invention, the related art and the disadvantages therein will be described with reference to the accompanying Figures.

Figure 1:
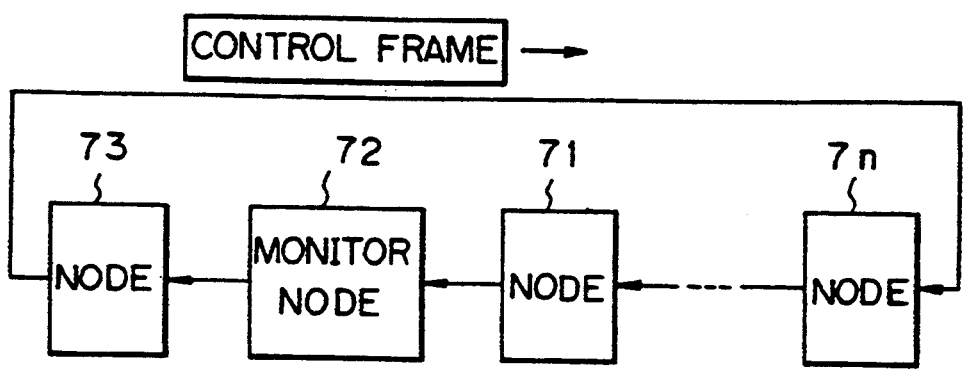
FIG. 1 illustrates a prior art single ring network.

FIG. 1 illustrates a prior art single ring network. The aforesaid token ring system is applicable to the type of single ring network illustrated in FIG. 1. In this single ring network, a plurality of nodes 71, 72, 73 . . . 7n are connected in a form of a ring via a ring line comprised of a coaxial line, a twisted pair line, and the like. The ring line usually carries out a one-way transfer of data of about 4 Mb/s. One of the nodes, for example, the node 72 is used as the monitor node. The monitor node 72 sends a control frame. The control frame turns around the ring line and returns to the monitor node 72. When the node 72 has confirmed the return of the control frame, the connection management is completed. Accordingly, the ring network is now in a communication enable status, and thus the node 72 transmits a token on the ring line. Whichever node receives the transmitted token can obtain the right to transmit data therefrom. Note, the token is reproduced by the monitor node.

Figure 2:
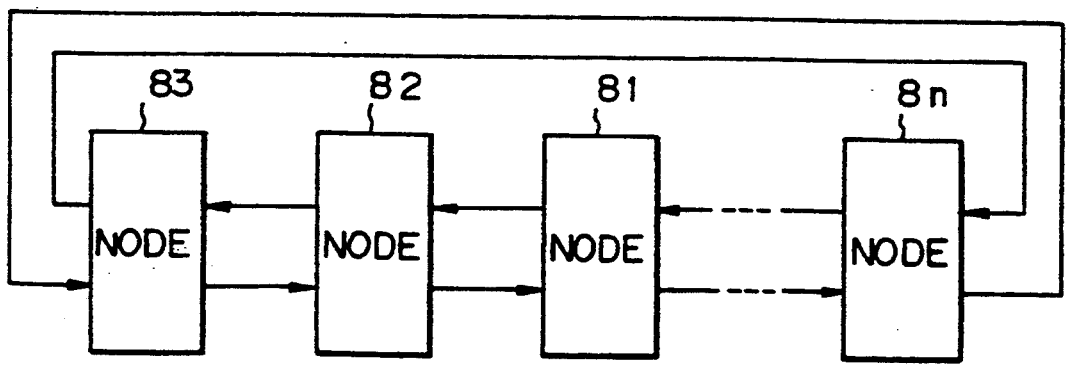
FIG. 2 illustrates a prior art double ring network.

FIG. 2 illustrates a prior art double ring network to which the FDDI system is applicable. In this double ring network, a plurality of nodes 81, 82, 83 . . . 8n are connected in the form of a ring via double rings comprised of an optical fiber line and the like. The double rings usually transfer high speed data of about 100 Mb/s, and a two-way data transfer can be made between each two adjacent nodes via the double lines. Accordingly, the connection management can be carried out between two adjacent nodes to finally confirm the establishment of a communication enable status.

In the above explained token ring system and FDDI system shown in FIGS. 1 and 2, however, the problems as mentioned previously in detail arise.

In the present invention, the connection management is carried out basically by transmitting from the own node one of several control patterns, selected in accordance with a communication status of the own node, to the downstream node, while receiving and discriminating a control pattern transmitted from the upstream node, to thereby determine a connection status of the related ring network.

Figure 3:
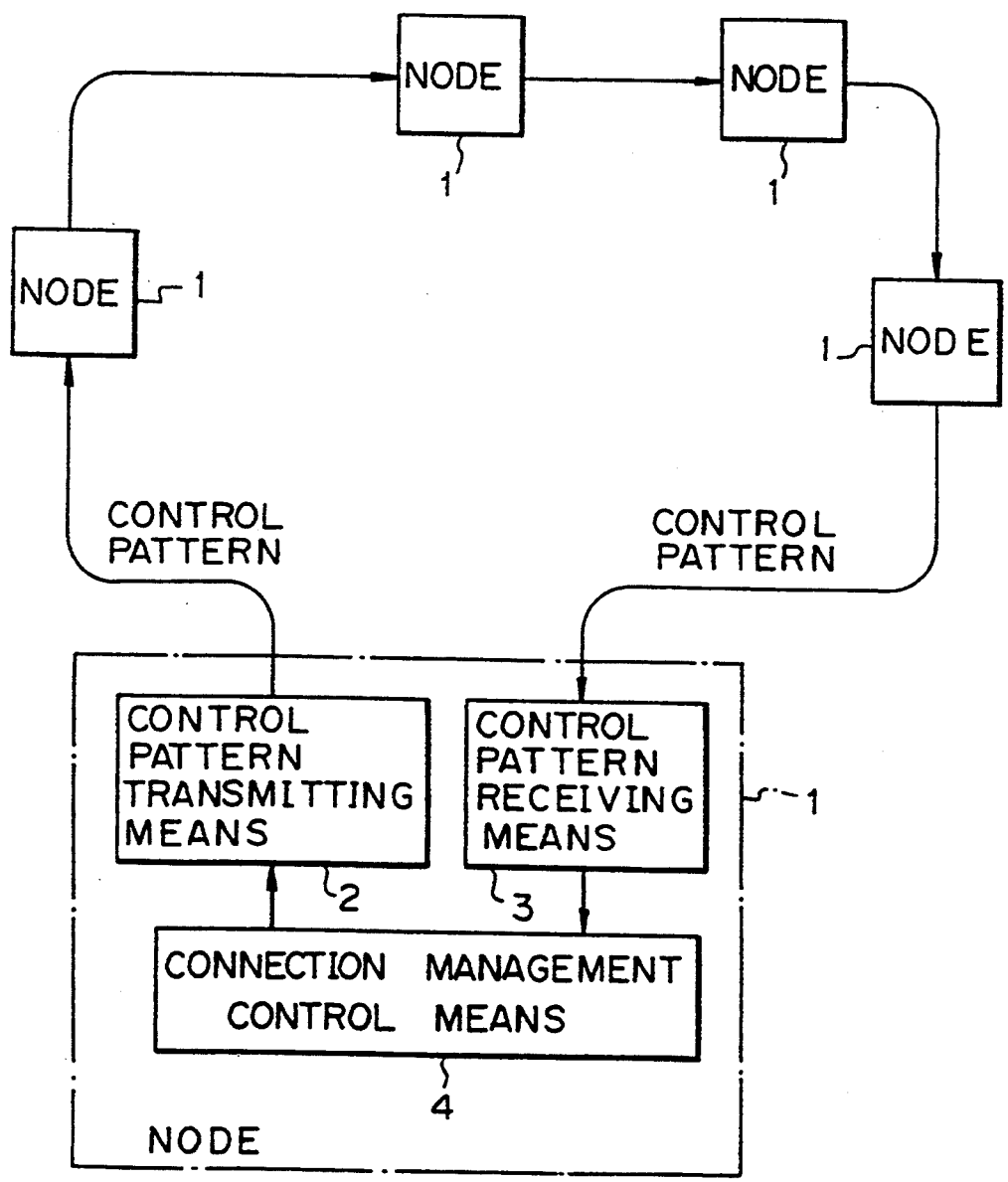
FIG. 3 illustrates a basic construction of a connection management system according to the present invention.

FIG. 3 illustrates a basic construction of a connection management system according to the present invention. In general, this connection management system employs a means for autonomously discriminating a communication status by using information indicating a status of the own node and information transmitted from the upstream node, and thereby each node itself determines whether or not a data communication is allowed, with the aid of the autonomously discriminating means.

More specifically, in FIG. 3, a plurality of nodes 1 are connected in series via a ring line, i.e., in a ring form. An arbitrary one of the nodes 1 is illustrated in detail. Each node 1 comprises a control pattern transmitting means 2, a control pattern receiving means 3, and a connection management control means 4. The control pattern transmitting means 2 selects one of at least three control patterns and transmits the thus selected control pattern to the downstream node 1. The three control patterns are a first control pattern indicating that the own node 1 is normal, a second control pattern indicating that both the own node 1 and the upstream node 1 are normal, and a third control pattern indicating that an abnormality has occurred. The control pattern receiving means 3 receives the control pattern transmitted from the upstream node and discriminates the nature of the received control pattern. The connection management control means 4 holds a communication status of the own node, changes the held communication status in accordance with the nature of the control pattern received by the control pattern receiving means 3 of the own side, and controls the control pattern transmitting means 2 in accordance with the thus changed communication status.

When an abnormality occurs in the own node or the upstream node or when the own node receives and discriminates the third control pattern indicating that the upstream node is abnormal, the control pattern transmitting means 2 of the own node transmits the third control pattern to the downstream node.

Further, when the own node is normal but there is no confirmation that the ring network as a whole has created an inherent connection status, the control pattern transmitting means 2 transmits the first control pattern to the downstream node.

When the received control pattern is discriminated as the first control pattern, the transmitting means 2 transmits the second control pattern. When the received control pattern is discriminated as the second control pattern, the second control pattern is transmitted to the downstream node. When an abnormal node is restored the control pattern transmitting means of the node repeatedly transmits the second control pattern a plurality of times to the downstream node if the control pattern receiving means of the restored node receives the first control pattern from the upstream node.

When the control pattern receiving means 3 of the node 1 repeatedly receives the second control pattern a predetermined number of times, the connection management control means 4 of this node determines that the ring network, as a whole has created an inherent connection status.

Each of the nodes 1 shown in FIG. 3 has the same construction, and accordingly, operates in the same way and exhibits the same function. Each connection management control means 4 itself determines the aforesaid communication status. The communication status includes, for example, first communication status, i.e., an inspection status in which it is determined whether or not the single line connecting the nodes 1 is formed as a ring; a second communication status, i.e., a connection status in which it is confirmed that the ring line is completed; and, a third communication status, i.e., an abnormality status in which the occurrence of an abnormality is detected and the node waits for the abnormality to be eliminated. The connection management control means 4 changes the above mentioned communication status held therein in accordance with the nature of the control pattern received and discriminated by the control pattern receiving means 3, and then transmits a control pattern corresponding to the thus changed communication status from the control pattern transmitting means to the downstream node.

The third control pattern is transmitted to the downstream node as the aforesaid abnormality status in either one of the following cases: the own node is in an abnormal state; a signal is not received since the upstream node is in an abnormal state; and, the third control pattern transmitted from the upstream node is received. In one the above cases, if the own node is in a normal state, the first control pattern, following the transmission of the third control pattern, is transmitted to the downstream node.

The inspection state is created after the transmission of the first control pattern, where the own node is normal but there is no confirmation that the ring network as a whole has created the inherent connection status, which corresponds to, for example, a term or delay required for an initial set up of the network, due to a power-ON thereof.

When the control pattern receiving means 3 receives and discriminates the first control pattern, it recognizes that the upstream node is normal, and therefore, the own node transmits the second control pattern to the downstream node. Accordingly, the downstream node is informed, by this second control pattern, that not only the own node but also the upstream node is normal in this case. When the control pattern receiving means 3 again receives and discriminates the first control pattern, the related node transmits the first control pattern to the downstream node. If the control pattern receiving means 3 receives and discriminates the second control pattern, the related own node informs the downstream node that both the own node and the upstream node are normal. Regarding the node 1 which was in the abnormal states but has been restored, when this node receives and discriminates the first control pattern transmitted from the upstream node, the node repeatedly transmits the second control pattern a plurality of times to the downstream node. Therefore, the first control pattern given thereafter from the upstream node is masked and not given to the downstream node. This enables a shortening of the term required for restoring an abnormality. Note, after the transmission of the second control pattern, if the first control pattern is repeatedly transmitted, this first control pattern is transmitted to the downstream node.

When the control pattern receiving means 3 repeatedly receives and discriminates the second control pattern a predetermined number of times, the connection management control means 4 changes the communication status of the own node to the connection status. Namely, the connection management control means 4 determines that the connection status has been created in the ring network, and thus the inherent data communication is started.

Embodiments of the present invention will be described hereinafter by way of examples; first, of the analog signal mode, and then of the digital signal mode.

Figure 4:
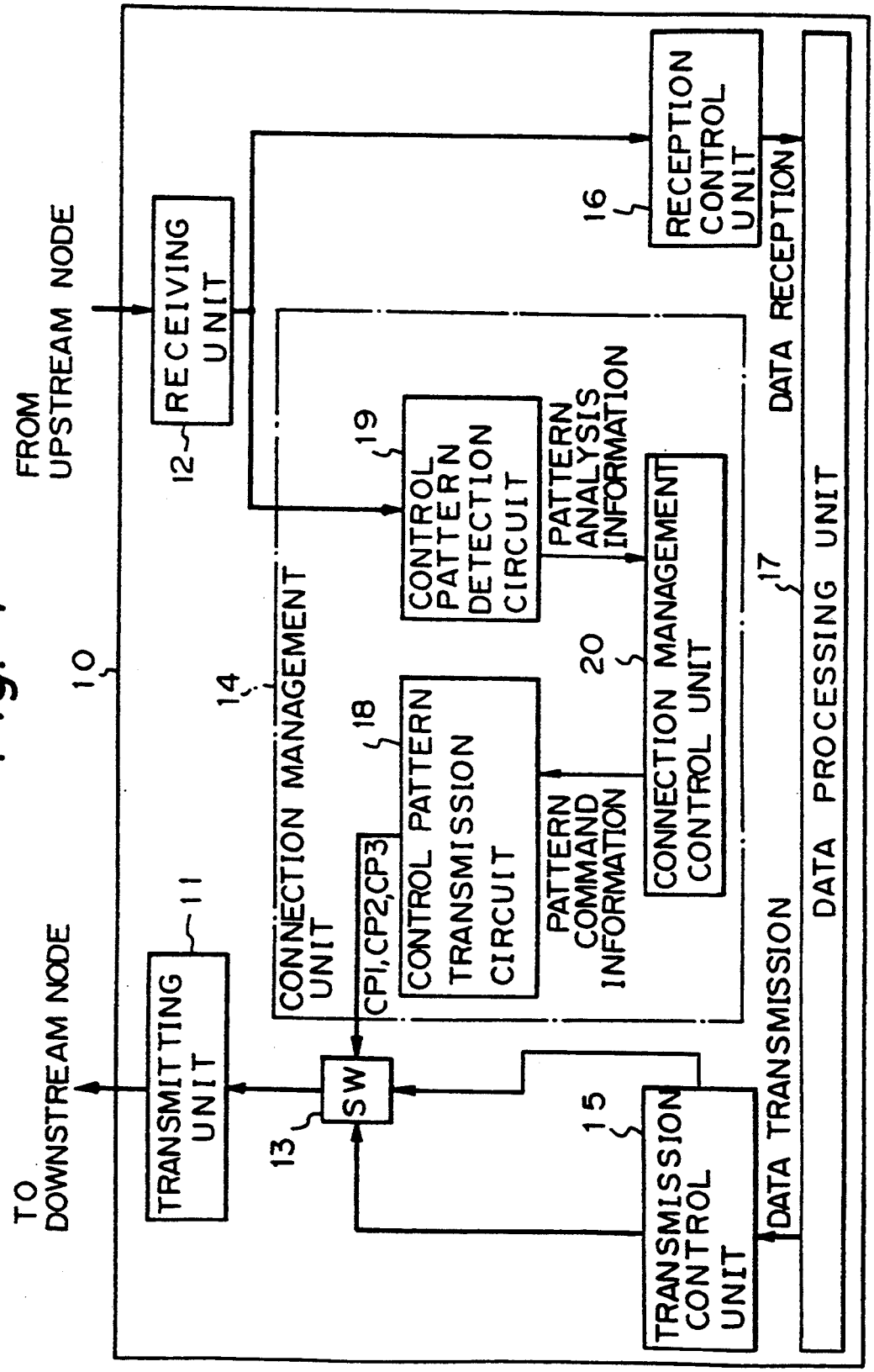
FIG. 4 is a block diagram showing a first embodiment of a node according to the present invention.

FIG. 4 is a block diagram showing a first embodiment of a node according to the present invention. The node 10, which is a representative of all of the nodes 1 shown in FIG. 3, handles analog signals via an analog signal mode ring line. In the Figure, reference numeral 11 denotes a transmitting unit which comprises a signal driver, 12 a receiving unit which comprises a signal receiver, 13 a switching circuit (SW), 14 a connection management unit, 15 a transmission control unit, 16 a reception control unit, and 17 a data processing unit which comprises at least a microprocessor ($\mu$P), memories (ROM, RAM) and a common bus, as well known. The connection management unit 14 comprises a control pattern transmission circuit 18, a control pattern detection circuit 19, and a connection management control unit 20.

According to pattern command information from the connection management control unit 20, the control pattern transmission circuit 18 produces one of the first control pattern CP1 indicating that the own node is normal, the second control pattern CP2 indicating that both the own node and the upstream node are normal, and the third control pattern CP3 indicating that an abnormality has occurred.

The control pattern detection circuit 19 discriminates the control pattern received from the upstream node to produce pattern analysis information which is transferred to the connection management control unit 20. The control pattern detection circuit 19 informs the connection management control unit 20 if the own node cannot receive a control pattern from the upstream node after an elapse of a predetermined term, by outputting pattern analysis information stating that a control pattern has not been received.

At least three communication statuses are defined in the connection management control unit 20, as follows: a first communication status, i.e., an inspection status in which it is determined whether or not the single line connecting the nodes is formed as a ring; a second communication status, i.e., a connection status in which it is confirmed that the ring line is completed; and, a third communication status, i.e., an abnormality status in which the occurrence of an abnormality is detected and the node waits for a restoration from the abnormality. The communication status defined in the connection management control unit 20 is changed in accordance with the pattern analysis information sent from the detection circuit 19, and according to the thus changed communication status, pattern command information is supplied to the control pattern transmission circuit 18 at each predetermined term T. If a control pattern is not received from the upstream node after an elapse of a predetermined term T, the communication status is changed to the abnormal state, and the third control pattern is output from the control pattern transmission circuit 18 to indicate the occurrence of an abnormality. The above function for defining the communication status is achieved by the connection management control unit 20 which can be realized by, for example, a known synchronous sequential circuit illustrated in FIG. 5.

Figure 5:
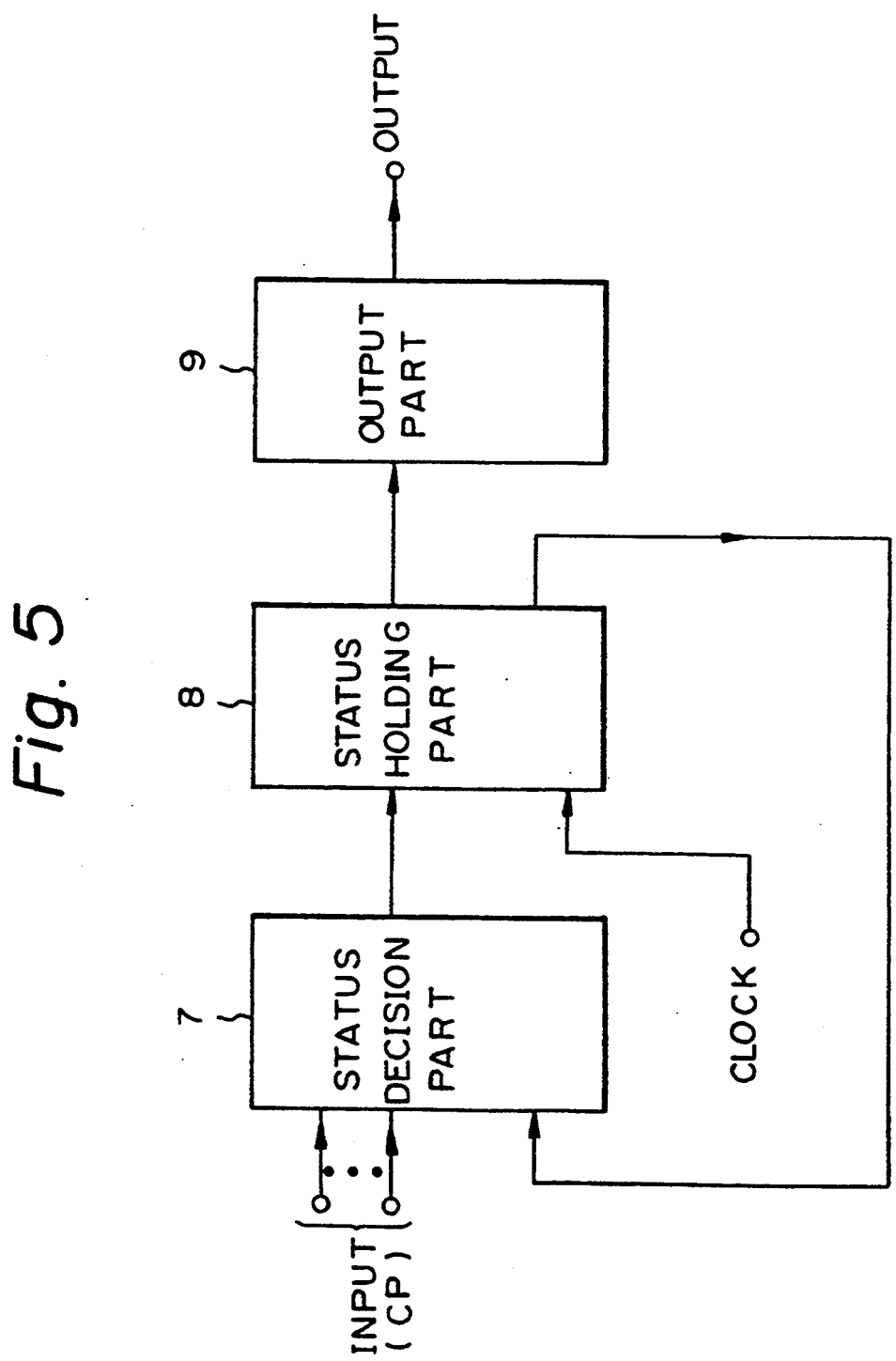
FIG. 5 is a schematic block diagram of a known synchronous sequential circuit.

FIG. 5 is a schematic block diagram of a known synchronous sequential circuit. The synchronous segmential circuit functionally comprises a status decision part 7, a status holding part 8, and an output part 9. The status holding part 8 holds the present communication status, i.e., the inspection status, the connection status, and the abnormal state and so on (as explained later). The present communication status is supplied from the status decision part 7 which receives, as an input ("INPUT"), the control pattern CP sent from the upstream node, and further receives the present status information fed back from the present communication status holding part 8. The thus held communication status is produced via the output port 9. This example of the synchronous sequential circuit handles about nine communication statuses, as disclosed later with reference to FIG. 9, and handles 4 bit data. In practice, the three parts 7, 8, and 9 can be realized by a known programmable logic array (PLA).

Referring again to FIG. 4, the transmission control unit 15 transfers the received transmission data to the transmitting unit 11 via the switching circuit 13. The switching circuit 13 is controlled by the data processing unit 17 via the transmission control unit 15 to selectively switch between the data transmissions mode and the control pattern mode. The reception control unit 16 transfers the data received at the receiving unit 12 to the data processing unit 17, which discriminates whether or not the destination of the received data is the own node. If the destination of the received data is not the own node, the received data is transferred through the unit 17 and sent, via the transmission control unit 15, to the downstream node.

Figure 6:
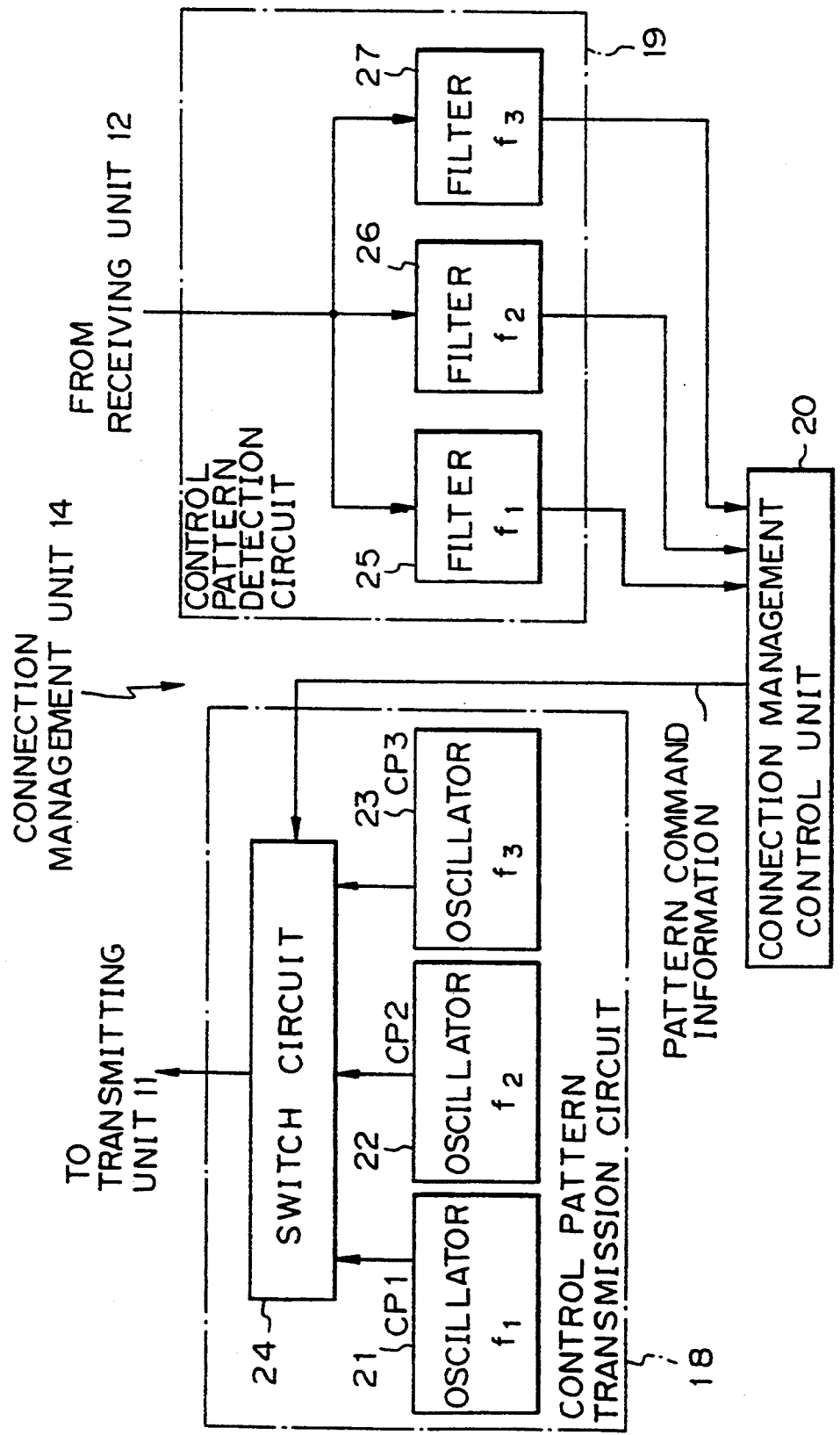
FIG. 6 is a block diagram showing the main portion of the connection management unit illustrated in FIG. 4.

FIG. 6 is a block diagram showing the main portion of the connection management unit illustrated in FIG. 4. In FIG. 6, three different frequencies $f_1$, $f_2$ and $f_3$ are used as the first, second and third control patterns CP1, CP2 and CP3, respectively. The control pattern transmission circuit 18 is composed of three oscillators 21, 22, and 23 having the frequencies $f_1$, $f_2$, and $f_3$, and a switch circuit 24. One of the control patterns of the frequencies $f_1$, $f_2$, and $f_3$ is selected by the switch circuit 24, operated in accordance with the pattern command information from the connection management control unit 20, and the thus selected control pattern is transferred to the transmitting unit 11. On the other hand, the control pattern detection circuit 19 is composed of filters 25, 26 and 27 having center frequencies $f_1$, $f_2$ and $f_3$, respectively. If another control pattern is needed, the corresponding pair of oscillator and filter may be used.

In an initial set up of each node, due to a power-on thereof or where an abnormal node is to be restored, the connection management control unit 20 in the corresponding node changes the communication status to the inspection status. During the inspection status, the connection management control unit 20 controls the switch circuit 24 to select the oscillator 21 and to produce the frequency $f_1$ thereof composing the first control pattern CP1.

When the first control pattern CP1 is received from the upstream node, the pattern CP1 is detected by the filter 25 in the control pattern detection circuit 19. In the above exemplified case, the first control pattern CP1 is received during the inspection status, and thus the connection management control unit 20 controls the switch circuit 24 to select the oscillator 22 to produce the frequency $f_2$ thereof composing the second control pattern CP2.

If the second control pattern CP2 is repeatedly received a predetermined number of times while the communication status is the inspection status, the connection management control unit 20 changes the communication status to the connection status to start the communication enable status. During the communication enable status, the connection management control unit 20 controls the switch circuit 24 to select the output frequency $f_2$, i.e., the second control pattern CP2.

If an abnormality occurs in a node, the connection management control unit 20 changes the communication status of the own node to the abnormal state and controls the switch circuit 24 to correspond to the abnormal state, and thus the output frequency $f_3$ of the oscillator 23 is repeatedly transmitted, as the third control pattern CP3. Further, where a control pattern is not sent from the upstream node after an elapse of a predetermined term T, the connection management control unit 20 changes the communication status to the abnormal state and controls the switch circuit 24 to correspond to this state, and accordingly, the switch circuit 24 selects the output frequency $f_3$ of the oscillator 23 as the third control pattern CP3. In this case, since the own node is normal, the first control pattern CP1 is transmitted after the transmission of the control pattern CP3.

Further, when the third control pattern CP3 is received from the upstream node, the connection management control unit 20 of the own node transmits the third control pattern CP3 and, at the same time, changes the communication status thereof to the inspection status.

Figure 7:
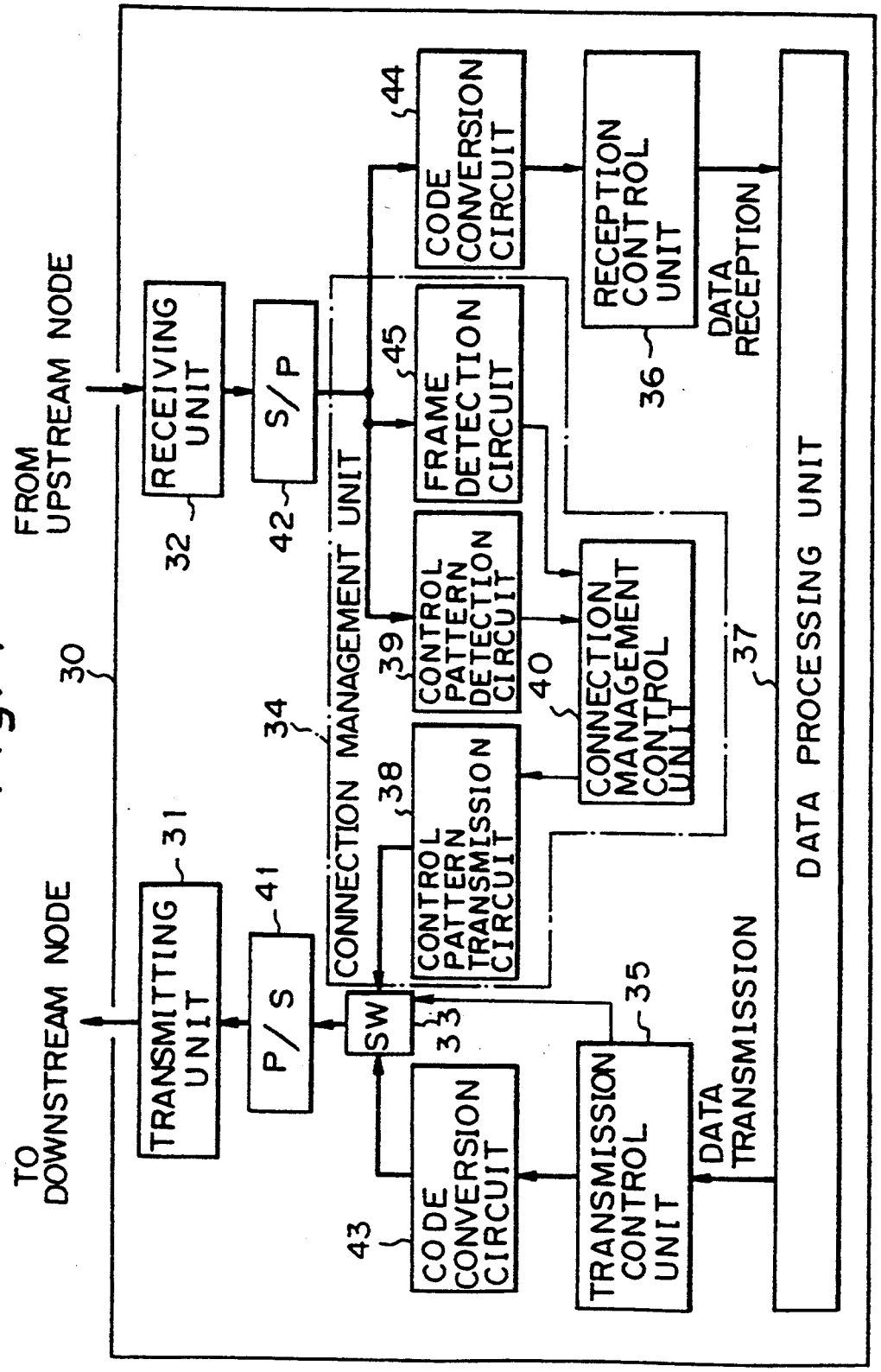
FIG. 7 is a block diagram showing a second embodiment of a node according to the present invention.

FIG. 7 is a block diagram showing a second embodiment of a node according to the present invention. The node 30, which is representative of all of the nodes 1 shown in FIG. 3, handles digital signals via a digital signal mode ring line. In the Figure, reference numeral 31 denotes a transmitting unit, 32 a receiving unit, 33 a switch circuit (SW), 34 a connection management unit, 35 a transmission control unit, 36 a reception control unit, 37 a data processing unit which comprises at least a microprocessor (μP), memories (ROM, RAM), and a common bus, as well known, 38 a control pattern transmission circuit, 39 a control pattern detection circuit, 40 a connection management control unit, 41 a parallel/serial converting circuit, 42 a serial/parallel converting circuits, 43 and 44 code conversion circuits which convert each code of transmitting and receiving data, and 45 a frame detection circuit.

In the second embodiment, the connection management is carried out by a digital processing, but the overall operation of the node 30 is substantially the same as that of the node 10 explained above. The control pattern transmission control circuit 38 is constructed such that the first, second and third control patterns are each composed of a predetermined arrangement of bits, and the control pattern detection circuit 39 is constructed such that the first through third control patterns, composed of the above predetermined arrangement of bits, can be discriminated from each other. The code conversion circuits 43 and 44 are used, respectively, to convert the code of data from the data processing unit 37 to the code to be transferred on the ring line, and to convert the code on the ring line to the code format suitable for handling by the data processing unit 37. For example, a 4B5B code is utilized for the code conversion by which a 4-bit code is converted to a 5-bit code, and vice versa. The 5-bit code is suitable for a transmission of data, and the 4-bit code is suitable for data processing.

The frame detection circuit 45 detects a frame signal from the data received and recognizes that the node 30 is now receiving data sent from the upstream node, and then informs the connection management control unit 40 of this occurrence, whereupon the unit 40 stops any change of the communication status, since a control pattern is not sent at that moment. Namely, an inherent data communication is to be realized at that stage. The parallel/serial converting circuit 41 converts parallel data or a parallel control pattern output from the switch circuit 33 to serial data or a serial control pattern to be applied to the transmitting unit 41. On the other hand, the serial/parallel converting circuit 42 converts the serial signal received at the receiving unit 32 to a parallel signal to be applied to the control pattern detection circuit 39, the code conversion circuit 44, and the frame detection circuit 45.

FIG. 8 is a block diagram showing the main portion of the connection management unit 34 illustrated in FIG. 7. The control pattern transmission circuit 38 comprises a selector 54 and control pattern generating units 51, 52 and 53 each having, for example, a register for storing the first, second and third control patterns CP1, CP2, and CP3, respectively. The control pattern detection circuit 39 comprises control pattern detecting units 55, 56, and 57 each having, for example, a logic gate by which the respective control patterns (CP1, CP2, CP3) are detected.

When the frame signal is detected by the frame detection circuit 45, a set signal is applied therefrom to a flip-flop 47, and a preset signal is applied therefrom to a frame counter 46. The receiving clock contained in the received signal is also applied to the frame counter 46. After the presetting of the frame counter 46 by the preset signal, the counter 46 starts to count up the count number therein by the receiving clock, and when the count number reaches a number equivalent to the length of one frame of data, the counter 46 applies a reset signal to the flip-flop 47. Accordingly, when the frame signal is detected by the detection circuit 45, the flip-flop 47 is set to produce a logic "1" at the Q output terminal thereof, which is applied to a gate circuit (G) 48 to open the same. The above logic "1" indicates that an inherent data signal is being received at the node. At this time, the status change clock is not allowed to pass through the gate circuit 48 to prevent the communication status from being changed in the connection management control unit 40, since inherent data is being handled. Therefore, the gate circuit 48 prevents a change of the communication status to an erroneous communication status, even if the receiving data partially includes a data pattern which happens to be the same as one of the control patterns.

When the receiving unit 32 receives the serial signal (serial bit signal) from the upstream node, the received serial signal is converted into a parallel signal (parallel bit signal) by the serial/parallel converting circuit 42. The classification of the control pattern contained in the parallel signal is detected by the control pattern detection circuit 39, and the resultant pattern classification information is sent to the connection management control unit 40. Upon receipt of this information, the communication status defined in the connection management control unit 40 is changed. The control pattern, selected in accordance with the thus changed communication status is then produced from the control pattern transmission circuit 38 when not in the timing of the inherent data transmission. The produced control pattern is applied to the parallel/serial converting circuit 41, via the switch circuit 33, for conversion into the serial signal to be sent to the downstream node from the transmitting unit 31.

Note, the various functions achieved in the node can be realized by not only hardware, as disclosed before, but also by software, through a processor. In this case, each node can be represented by a processor to construct a multiprocessor system, as mentioned above, by using a high speed transmission line of over 100 Mb/s as the ring line connecting the processors in the form of a ring.

FIG. 9 depicts various modes of status changes exhibited in each node according to the present invention. Namely, the Figure shows the transmission and reception of the first, second and third control patterns CP1, CP2, AND CP3 used in the first and second embodiments and the status following a present status by using status modes classified into, for example, nine categories, i.e., S1 through S9.

The inspection status is classified, as an example, into a first status S1 in which the own node is normal, a second status S2 in which both the own node and the upstream node are normal, and a third status S3 in which the connection of the ring is under confirmation and, therefore, the connection is not yet completed (connection confirmation status). The connection state is represented by a fourth status S4 in which it is confirmed that the ring is normally connected (connection status). The abnormal state is classified, as an example, into a fifth status S5 in which a signal cannot be received from the upstream node, a sixth status S6 in which a wait for a restoration from an abnormal state is made, seventh and eighth statuses S7 and S8 in which a signal can be received from the upstream node and the abnormality is restored, and a ninth status S9 in which a warning of an abnormality sent from the upstream node is given to the downstream node.

One of the first, second and third control patterns CP1, CP2, and CP3 is selected in accordance with the various communication statuses S1 through S9, and the communication status is changed to the next status in accordance with the received control patterns CP1, CP2, and CP3. Note that a reception error in the abnormality status S6 denotes that a signal cannot be received from the upstream node. If this signal non-reception state occurs in a state other than the abnormal state S6, the communication status is changed to the abnormality detection status S5.

For example, when the communication status is the connection status S4, during which the second control pattern CP2 is transmitted, and if the second control pattern is received under the same status, the communication status is not changed. But under the same status, if the third control pattern CP3 is received instead of the pattern CP2, the communication status is changed to the abnormality warning status S9. Note the "CP1 and CP2" depicted in the "RECEIVING PATTERN" column crossing the S1 row denote that either the CP1 or CP2 has been received. Similarly, the "RECEPTION ERROR", CP2 and CP3 depicted in the same column crossing the S6 row denote that a reception error or the CP2 or the CP3 exists. The rules shown in FIG. 9 are used as a reference in the following explanation of FIGS. 12, 13, and 14.

Figure 10:
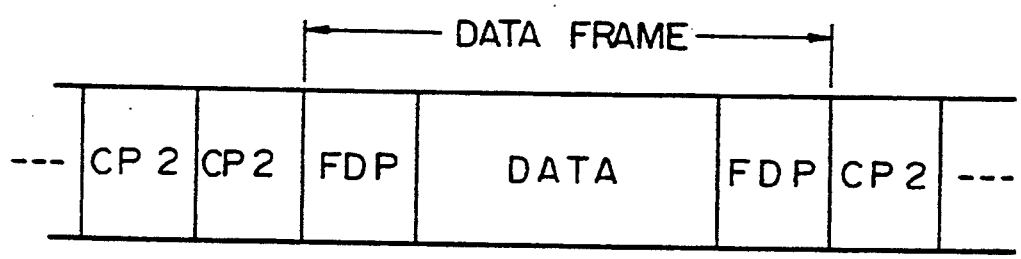
FIG. 10 shows an example of a transmission frame transferred on a ring line.

FIG. 10 shows an example of a transmission frame transferred on a ring line. Note that the shown transmission frame appears on the digital signal mode ring line, not the analog signal mode ring line. The data to be transmitted ("DATA") is accompanied, at the head and end thereof, by frame delimiter patterns (FDP's) to form one data frame. During the time such a data frame does not exist, the second control pattern CP2 is repeatedly transferred at each predetermined term. This continuous flow of the CP2 enables an easy and rapid detection of an absence of a signal due to an abnormality. Note, the length of the data frame matches the maximum count number of the frame counter 46 shown in FIG. 8.

Figure 11:
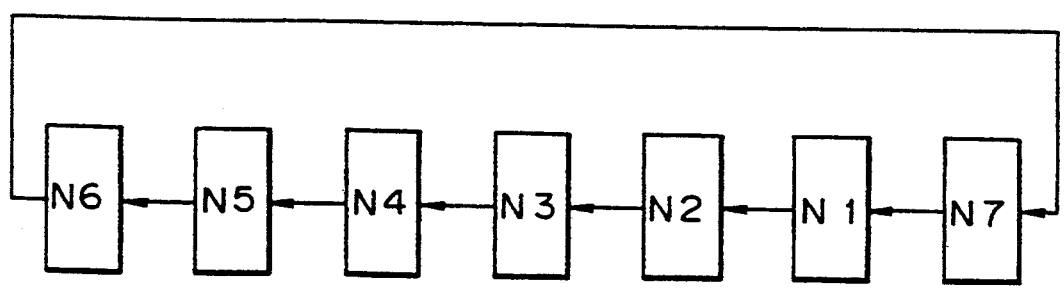
FIG. 11 illustrates a ring network subjected to the system according to the present invention.

FIG. 11 illustrates a ring network subjected to the system according to the present invention. The ring network according to the present invention is different from those shown in FIGS. 1 and 2, although the ring network of FIG. 1 is similar to that of FIG. 11 from the viewpoint of ring structure, i.e., a single ring line, but is different in that the monitor node 72 is required. The ring network of FIG. 2 is similar to that of FIG. 11 from the view point that the monitor node 72 is not required, but has a different ring structure, i.e., double ring lines.

In FIG. 11, nodes N1 through N7 have the same construction as exemplified in FIGS. 4 and 7, and are connected in series via, for example, and optical fiber transmission line, to form a ring. In the ring network, when an initial set up of the ring network is commenced, the nodes N1 through N7 are put in the power ON status almost simultaneously. This will be schematically explained below with reference to the Figure.

FIG. 12 depicts a time sequence for explaining a normal set up of a ring network. Note that this explanation will be made with reference to FIGS. 7 and 8, but the same explanation applies to FIGS. 4 and 6.

Upon a power ON of the nodes N1 through N7, the status change clock (FIG. 8) is applied to the connection management control unit 40 via the gate circuit 48 at each predetermined term T. If the own node is normal, the communication status is set as the first status S1, which indicates that the own node is normal. In this case, the connection management control unit 40 controls the selector 54 in the control pattern transmission circuit 38 to select the first control pattern CP1 output from the control pattern generating unit 51, and the thus-selected CP1 is transmitted to the downstream node.

Each of the nodes N1 through N7 receives the first control pattern CP1 sent from the respective upstream nodes, and accordingly, each node detects the pattern CP1 at the control pattern detecting unit 55 in the control pattern detection circuit 39. The thus-detected pattern classification information is applied to the connection management control unit 40, and therefore, the communication status is changed, upon the application of the next status change clock, from the first status S1 in which the own node is normal to the second status S2 in which the upstream node is normal. Since the communication status is now the second status S2, at the term 2T (FIG. 12), the second pattern CP2 output from the control pattern generating unit 52 in the control pattern transmission circuit 38 is selected by the selector 54 and transmitted to the downstream node. Refer to the right most column of FIG. 9 to obtain an understanding of the status change.

Each of the nodes N1 through N7 receives a signal from the respective upstream nodes and discriminates the second control pattern CP2, and thus the communication status in each node is changed, upon the application of the next status change clock, from the second status S2, in which the respective upstream node is normal, to the third status S3, i.e., the connection confirmation status. At the term 3T (FIG. 12), each node transmits the second control pattern CP2 to the respective down stream nodes. Further, each of the nodes N1 through N7 receives the signal sent from the respective upstream nodes and discriminates the second control pattern CP2, and thus the communication status in each node is changed, upon the application of the next status change clock, from the third status S3, i.e., the connection confirmation status, to the fourth status S4, i.e., the connection status. At the term 4T (FIG. 12), each node transmits the second control pattern CP2 to the respective downstream nodes. After the term 4T, if the second control pattern CP2 is still received, no change occurs in the communication status at each node, and thus the fourth status S4, i.e., the connection status, is maintained as it is, wherein the second control pattern CP2 is repeatedly transmitted at each predetermined term T as depicted in FIG. 10. Accordingly, four terms (4T) after power ON, the communication status in each node is set to the communication enable status. Note, the four terms (4T) are common to all of the nodes N1 through N7, and further, are not varied regardless of an increase (or decrease) in the number of the nodes.

FIG. 13 depicts a time sequence for explaining a case wherein an abnormality has occurred. In the example, an abnormality such as a break in the ring line has occurred between the nodes N1 and N7, shown by a vertical arrow in FIG. 13 and represented by a symbol "X". At this time, each node N1 through N7 transmits the second control pattern CP2 under the fourth status S4, i.e., the connection status. Subsequently, due to the abnormality "X", the node N1 can no longer receive the second control pattern CP2 from the upstream node N7, and thereafter, at the timing of the next status change clock, the connection status of the connection management control unit 40 of the node N1 is changed to the fifth status S5, i.e., the abnormality detection state. Accordingly, at the term 1T (FIG. 13), the selector 54 (FIG. 8) of the node N1 selects the third control pattern CP3 produced from the control pattern generating unit 53 in the control pattern transmission circuit 38, and the CP3 is then transmitted to the relevant downstream node, i.e., N2.

At the next term 2T (FIG. 13), the communication status of the node N1 is changed to the sixth status S6, i.e., the abnormality state. During the status S6, the node 1 transmits the first control pattern CP1 to the downstream node N2, and thereafter, the sixth status S6 is maintained until the node N1 receives a signal from the upstream node N7. During this series of sixth statuses S6, the node N1 repeatedly transmits the first control pattern CP1 at each predetermined term T.

The node N2 receives the signal and discriminates the third control pattern CP3 sent from the node N1 at the term 1T (FIG. 13). Accordingly, the communication status of the node N2 is changed from the fourth status S4, i.e., the connection status, to the ninth status S9, i.e., the abnormality warning status, and transmits the third control pattern CP3 to the downstream node N3 at the term 2T (FIG. 13), and then the communication status of the node N2 is changed to the first status S1, indicating that the own node (N2) is normal. Then, the node N2 continues to receive the first control pattern CP1 only from the node N1, as shown in FIG. 13. If the node N2, during a transmission of CP1 therefrom, receives the first control pattern CP1 from the node N1, the communication status of the node N1 is changed to the second status S2 and the node N2 transmits the second control pattern CP2. Conversely, if the node N2, during a transmission of the second control pattern CP2 therefrom, again receives the first control pattern CP1, the node N1 returns to the first status S1 and the node N2 transmits the first control pattern CP1. Consequently, the communication status of the node N2 is changed to the statuses S1 and S2 alternately, as shown in FIG. 13, and thus the corresponding control patterns CP1 and CP2 are transmitted alternately from the node N1 to the node N2 at each predetermined term T cyclically.

Each of the nodes downstream of the node N2, i.e., N3, N4, N5 and so on, operates in the same way as the node N2, as explained above. Namely, although the communication status of the node N1 is maintained at the sixth status S6, each of the other nodes N2 through N7 repeats the first status S1 indicating that the own node is normal and the second status S2 indicating that both the own node and the node upstream thereof are normal, alternately.

Before the repetition of CP1 and CP2, as shown in FIG. 13, the third control pattern CP3 is propagated from the node N1 to the node N7. Namely, the nodes are sequentially notified of the occurrence of an abnormality by the pattern CP3, and finally operation of the ring network as a whole is stopped. The time needed to stop the working of the ring is n.T, where n denotes the number of nodes (in the example, n=7) and T denotes the predetermined term. The above mentioned series of operations will apply, of course, to a case where an abnormality occurs inside the node and not outside the node, as mentioned above. Namely, the abnormal node will operate in the same way as the node N1.

FIG. 14 depicts a time sequence for explaining a case where an abnormality is restored and working is restarted. The abnormality between the nodes N1 and N7 (represented by "X") is assumed to have been restored by an operator. The restored abnormality is represented by "o" in FIG. 14. At this time, the node N1 receives the signal from the upstream node N7 and discriminates the first control pattern CP1, and the communication status of the node N1 is changed from the sixth status S6, i.e., the abnormal state, to the seventh status S7, i.e., the abnormality restored status. Under this status, upon receipt of the first control pattern CP1 sent first from the node N7, the node N1 repeatedly transmits, for example three times, the second control pattern CP2 to the downstream node N2. Namely, the second pattern CP2 is transmitted three times at the terms 1T, 2T and 3T (FIG. 14). In this case, the first control pattern CP1 transmitted from the node N7 at the term 2T is ignored by the node N1, and thus the communication status in the node N1 is changed as follows: to the seventh status S7 at 1T, to the eighth status S8 at 2T, and to the second status S2 at 3T, in this order. The status S7 is the abnormality restored status 1 the status S8 is the abnormality restored status 2 and the status S2 indicates that, in this case, both the nodes N1 and N7 are normal.

At the term 3T in FIG. 14, the node N1 (in S2) receives the second control pattern CP2 from the upstream node N7, and thus thereby the communication status of the node N1 is changed from the second status S2 to the third status S3, i.e., the connection confirmation status. Under the status S3, the node N1 transmits the second control pattern CP2 at the term 4T (FIG. 14) to the downstream node N2. But, at this term 4T, since the node N1 in the status S3 has received the first control pattern CP1 from the node N7, the node N1 is returned to the first status S1 indicating that the own node (N1) is normal. Therefore, the node N1 transmits the first control pattern CP1, at the term 5T (FIG. 14), to the downstream node N2.

The node N2 shown in FIG. 14 is repeatedly, i.e., at least three times, supplied with the second control patterns CP2 from the upstream node N1. Upon reception of the CP2 series, the communication status of the node N2 is changed to, e.g., the first status S1 (N2 is normal) at 1T, to the second status S2 (N2 and N1 are normal) at 2T, to the third status S3 (confirmation of connection) at 3T, and to the fourth status S4 at 4T, in this order. The status S4 is the final connection status. Next, at the term 5T, the node N2 receives the first control pattern CP1 from the node N1. In this case, the node N2 receives the control pattern CP1 under the fourth status S4, i.e., connection status. In this case, the node N2 is returned to the second status S2 (indicating that the node N2 is normal) at the term 6T. At the same time, the node N2 transmits the second control pattern CP2 to the downstream node N3. Namely, the first control pattern CP1 from the node N1 is replaced by the second control pattern CP2.

At the term 7T wherein the node N2 receives the first control pattern CP1 transmitted from the node N1, since the communication status of the node N2 is the third status S3, i.e., the connection confirmation status, the status of the node N2 is changed, at the term 8T, to the first status S1 indicating that the node N2 is normal, and thus the node N2 transmits the first control pattern CP1 to the downstream node N3 at the term 8T. In this case, the thus transmitted control pattern CP1 is received by the node N3 which is now in the fourth status S4, i.e., the connection status. Accordingly, the connection status of the node N3 is changed from S4 to S2 (refer to the rightmost column of FIG. 9). Therefore, the node N3 transmits the second control pattern CP2, at the term 9T, to the downstream node N4. Namely, the first control pattern CP1 from the node N2 (8T) is replaced by the second control pattern CP2 in the node N2 (9T).

The above operation also apply to the remaining nodes N4 through N7, and accordingly, when the second control pattern CP2, transmitted from the node N1 repeatedly (three times) during the abnormality restoration process (1T, 2T, 3T), passes through each downstream node, the first control pattern CP1 at each node is replaced by the second control pattern CP2. Therefore, the number of continuous second control patterns CP2 is m×2+3, where m denotes the number of passed nodes. For example, the second control pattern CP2 passing through the node N3 continues on "9" times (4T through 11T twice). In this example of the ring network (refer to FIG. 11), the number "9" is larger than the number of nodes (N1 through N7), i.e., "7", and therefore, the first control pattern CP1 (refer to FIG. 14) crosspoints of ((5T, N1) and (8T, N2)) is no longer propagated to the downstream nodes N3 through N7.

Therefore, the term from when the node N1 has detected the abnormality restoration to when the connection status S4 is established in the node N4, becomes 6T, i.e., 3T+3T, where the former 3T is derived from a propagation delay of the second control pattern CP2 and the latter 3T is derived from the time needed to change from the second status S2 to the fourth status S4, i.e., the connection status. In this way the connection status S4 is confirmed at the nodes N5, N6 and N7 one by one, in this order. Finally, the connection status S4 at the node N3 is confirmed, and thus, at the term 11T, all of the nodes are in the connection status and the operation of the ring network as a whole is restarted.

The processing time required for the initial set up of the ring network, becomes 4T where a power ON of the nodes is made simultaneously, as shown in FIG. 12. Conversely, where a power ON of the nodes is made at different timings, the processing time from a power ON of the last node to when the all of the nodes are in the connection status, becomes substantially equal to the processing time needed for the abnormality restoration, mentioned above. The processing time needed for the abnormality restoration is expressed as (3k+5)T, where k is defined as a minimum integer not lower than when k satisfies 2k+3>n, where n denotes the number of nodes. Accordingly, when n=7 as in the above example, i.e., k=2, the processing time for the abnormality restoration becomes 11T as shown in FIG. 14.

Further, the predetermined term T is determined in accordance with various conditions such as the distance between each adjacent node, the time needed for the detection and discrimination of the control pattern (CP), the operation speed of the synchronous sequential circuit (FIG. 5), and so on. Namely, the above conditions are irrelevant to the scale of the related ring network per se. For example, if the distance between the nodes is short, the data transmission speed is high and the operation speed of the synchronous sequential circuit is also high, the predetermined term T can be determined as a very small value.

More specifically, the time for detecting the control pattern (CP) composed of, for example, a 5-bit code, is 40 ns less, for example, a 125 Mb/s transmission ring line; and the transmission delay is about 500 ns under, for example, a distance of 500 m between each two adjacent nodes. Under the above specified conditions, the status change interval performed in the connection management control unit 40 (FIGS. 7 and 8), i.e., the predetermined term T, can be determined as about 600 ns (=40 ns+500 ns). In this case, the processing time where the number of the nodes is "16" and the total length of the related ring network is 1.6 km, becomes 2.4 to 15.6 μs during a normal initial set up of the network; becomes 9.6 μs during the term from an occurrence of an abnormality to a stoppage of operations; and becomes 15.6 μs during the term from an abnormality restoration to a restarting of the operation of the network. This order (μs) of the processing time can be disregarded, since about 1 ms is needed just to complete a synchronous pull-in operation in an optical signal transmission.

FIGS. 15A through 15J are diagrams of the ring network, explaining the changes of both the status (S) and the control pattern (CP). The various modes of the status changes and the control patterns shown in FIG. 9 are clarified by the use of the time sequences depicted in the FIGS. 12, 13, and FIG. 14. The contents of FIG. 9 can be understood as different from FIGS. 12, 13 and 14, by referring to FIGS. 15A through 15J. Note that the function according to the present invention explained with reference to FIGS. 12, 13, and 14 is basically the same as the function explained with reference to FIGS. 15A through 15J. It should be understood that all of the modes revealed in FIG. 9 cannot be expressed through FIGS. 15A through 15J, and only representative and important modes are revealed therein. Further, only four nodes N1 through N4 are recited therein for clarification.

Figure 15A:
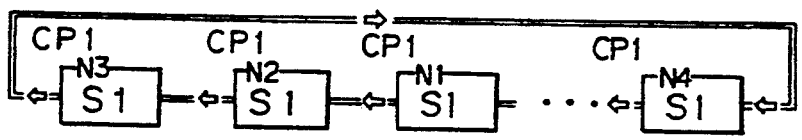

FIG. 15A represents a mode wherein all the nodes are normal and respective transmissions of the control patterns (CP) are started simultaneously. Note that the character S when accompanied by a numeral indicates the status previously explained.

Figure 15B:
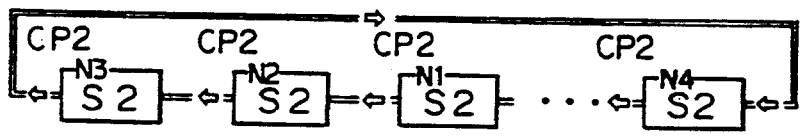

FIG. 15B represents a mode wherein each node determines by itself that each upstream node is normal.

Figure 15C:
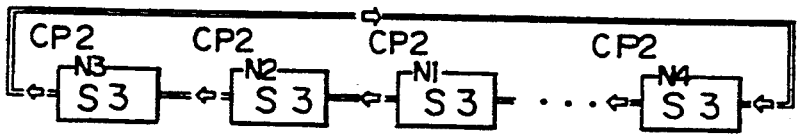

FIG. 15C represents a mode wherein each node determines that each two successive upstream nodes are normal.

Figure 15D:
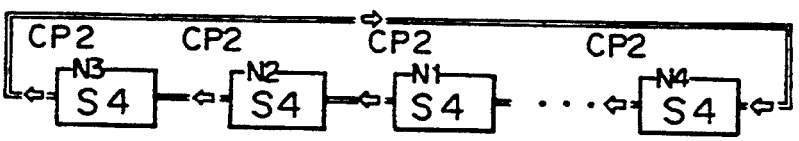

FIG. 15D represents a mode wherein each node in the connection confirming status S3 receives the control pattern indicating that each upstream node is normal. In this mode, each node is in the communication enable status, and thus the related ring network can start the inherent data transmission.

Figure 15E:
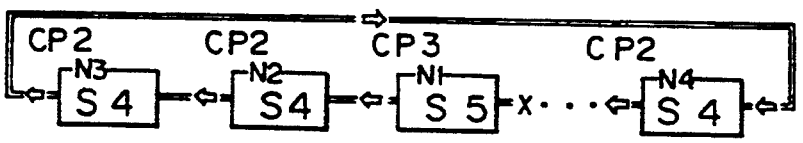

FIG. 15E represents an abnormal status. Namely, a break in the ring line, for example, occurs as indicated by "X". In this case, the reception error occurs in the node N1, which is then put in the abnormality detection status.

Figure 15F:
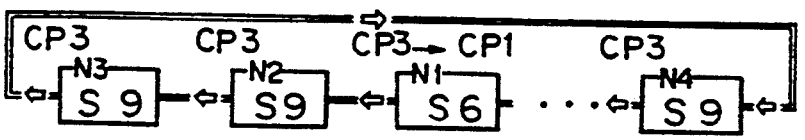

FIG. 15F represents a mode wherein the communication status of the node N1 is changed from the abnormality detection status S5 to the abnormal state S6. The remaining nodes are in the abnormality warning status.

Figure 15G:
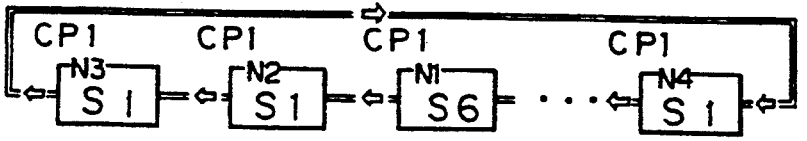

FIG. 15G represents a mode wherein each node determines by itself whether or not it is normal.

FIG. 15H represents a mode wherein the abnormality is restored by repairing the break in the ring line, and the communication status of the node N1 is changed from the abnormal state S6 to the abnormality restoration status 1, i.e., S7, as the node N1 has received the control pattern CP1 (indicating that the own node is normal) from the upstream node N4. The control pattern CP1 from the node N4 is then changed to CP2.

FIG. 15I represents, in the upper row, a mode wherein the communication status of the node N1 is changed from the abnormality restoration status 1, i.e., S7, to the abnormality restoration status 2, i.e., S8, and in the lower row, represents a mode wherein the communication status of the node N1 is changed from the abnormality restoration status 2, i.e., S8, to the second status S2 indicating that both nodes N1 and N4 are normal.

FIG. 15J represents, in the upper row, a mode wherein the communication status of the node N1 is changed to the connection confirmation status S3, by the reception of the second control pattern CP2 from the upstream node N4, and in the lower row, represents a mode wherein all of the nodes are restored to the respective connection statuses S4, which mode is identical to that of FIG. 15D.

FIG. 16 shows an example of transmission codes transferred on the digital ring line. Each transmission code in the example is composed by using the 4B5B code mentioned previously. The 5 bit (5B) code can represent 16 ($=2^4$) varieties of inherent data patterns 0 through 15 and three varieties of the control patterns CP1 through CP3, the frame delimiter pattern FDP (refer to FIG. 10), the token pattern and unused pattern; namely, 22 ($<2^5$) varieties of codes in all. The 4B5B code is useful for obtaining codes including a plurality of logics "1". As well known, each logic "1" is used to reproduce a clock signal from the received data codes, and therefore, the transmission codes including a balanced logic "1", such as Nos. 2 through 7, 9, 11 through 18 and 20, are allotted to the inherent data patterns.

Regarding the control patterns CP1, CP2, and CP3, since these codes appear irregularly, as understood from FIG. 13, they must be clearly distinguished from each other. To this end the transmission codes of the CP1, CP2, and CP3 must have bit patterns such that first, no bit pattern identical to CP3 exists in any series of 5 bits in the CP1 series or the CP2 series; second, no bit pattern identical to CP2 exists in any series of 5 bits in the CP1 series or the CP3 series; third, no bit pattern identical to CP1 exists in any series of 5 bits in the CP3 series or CP2 series; and finally, no bit pattern identical to CP3 exists in any series of 5 bits in the CP1 and CP2 series appearing alternately, i.e., CP1→CP2→CP1→CP2..., as shown in FIGS. 13 and 14. Obviously, if such an identical bit pattern does exist, an erroneous code pattern discrimination has been made.

Nevertheless, the frame delimitter pattern (FDP) includes no logic "1", because the FDP does not appear frequently, and it is more necessary to ensure the extraction of the portion of the data frame (FIG. 10) from the continuous flow of bit patterns.

The first and second embodiments were explained above by taking into account the case of a single ring network. But, as previously mentioned in the description, the present invention can be applied to a double ring network, if necessary, by using either one of the related double rings as a single ring. Further, in the embodiments described, only three control patterns CP1, CP2 and CP3 were used, but obviously other different control patterns can be used in addition to CP1, CP2, and CP3. These additional control pattern or patterns may be utilized for a process such as a bypass and the like during the abnormal status. Furthermore, the number of statuses to be changed in the connection management control unit 4, 20, and 40 may be increased in accordance with an increase of the number of control patterns.

As explained above in detail, according to the present invention, the communication status defined in the connection management control unit is changed in accordance with both the nature of the received control pattern and the own node status, and then the corresponding control pattern is selected and transmitted to the downstream node. Accordingly, the connection management such as an operation stoppage for the network, an operation restart, and so on, can be realized with a dispersed control system, and thus it is possible to control a ring network by a relatively simple procedure, even in, for example, a high speed optical fiber ring network, such as over 100 Mb/s, accommodating a plurality of nodes. Note, the advantages of the present invention are not affected by the scale of the ring network.

What is claimed is:

1. A communication node in a system for carrying out connection management of a ring network connecting an upstream node and a downstream node thereto in series via a ring line, comprising:

discriminating means for autonomously discriminating a communication status by using information indicating a node status and status information transmitted from an upstream node, the node thereby determining whether to proceed with data communication, said discriminating means including control pattern transmitting means for transmitting one of three control patterns to a downstream node independently of the status information of other nodes, said three control patterns including:
a first control pattern indicating that the node status is normal,
a second control pattern indicating that the node status and an upstream node status are normal, and
a third control pattern indicating an abnormality of at least one of the node and at least one of the upstream nodes;
control pattern receiving means for receiving the third control pattern transmitted from the upstream node and discriminating the received third control pattern; and
connection management control means for holding the node status, changing the node status in accordance with the third control pattern received by said control pattern receiving means and controlling said control pattern transmitting means of the node to transmit the third control pattern.

2. A system as set forth in claim 1, wherein the ring network is operated as an analog signal mode network using at least three analog signals having different predetermined frequencies allotted to each of the control patterns.

3. A system as set forth in claim 1, wherein the ring network is operated as a digital signal mode network using at least three digital signals having different predetermined transmission codes allotted to each of the control patterns.

4. A system for carrying out connection management of a ring network, said system comprising:
a plurality of nodes, including an own node, an upstream node and a downstream node connected in series via a ring line, the own node operatively connected to the upstream node and the downstream node, each node having a communication status, and at least three control patterns being provided for each node, each of said nodes including control pattern transmitting means for transmitting one of the three control patterns to the downstream node, independently of the communication status of other nodes, the at least three control patterns including:
  a first control pattern indicating that a status of the own node is normal,
  a second control pattern indicating that the status of the own node and the upstream node are normal, and
  a third control pattern indicating an abnormality of one of the own node and at least the upstream node;
control pattern receiving means for receiving the third control pattern transmitted from the upstream node and for discriminating the received third control pattern; and
connection management control means for holding the communication status of the own node, changing the communication status of the own node in accordance with the third control pattern received by said control pattern receiving means and controlling said control pattern transmitting means of the own node to transmit the third control pattern.

5. A system as set forth in claim 4, wherein the control pattern is controlled by said connection management control means to transmit the first control pattern when the own node is normal.

6. A system as set forth in claim 4, wherein when said control pattern receiving means discriminates whether the control pattern received is the first control pattern, and the control pattern transmitting means corresponding thereto then transmits the second control pattern to the downstream node.

7. A system as set forth in claim 4, wherein said connection management control means places the own node in a communication enable status upon receipt of the second control pattern from the upstream node.

8. A system as set forth in claim 4, wherein said control pattern transmitting means transmits the third control pattern to the downstream node when at least one of the own node is abnormal and an abnormality has occurred in the upstream node.

9. A system as set forth in claim 4, wherein said control pattern transmitting means transmits the third control pattern to the downstream node when the own node is in a communication enable status, and at the same time, when one of an abnormality has occurred in the upstream node and the third control pattern is transmitted from the upstream node and received at the own node.

10. A system as set forth in claim 4,
  wherein the third control pattern is transmitted from said control pattern transmitting means of the own node to the downstream node when one of the own node and the upstream node is abnormal, and when said control pattern receiving means discriminates that the control pattern received from the upstream node is the third control pattern,
  wherein said control pattern transmitting means transmits the first control pattern to the downstream node when the own node is normal and confirmation has not been received that the ring network as a whole has created an inherent connection status,
  wherein said control pattern transmitting means transmits the second control pattern to the downstream node when the control pattern receiving means discriminates that the control pattern received is the first control pattern, and repeatedly transmits the second control pattern when the abnormality is restored, and
  wherein said connection management control means determines that the ring network as a whole has created an inherent connection status.

11. A system as set forth in claim 4, wherein the ring network is operated as an analog signal mode network using three analog signals having different predetermined frequencies allotted to the first, second and third control patterns, respectively.

12. A system as set forth in claim 4, wherein the ring network is operated as a digital signal mode network using three digital signals having different predetermined transmission codes allotted to the first, second and third control patterns, respectively.

13. A system for carrying out connection management of a ring network having a plurality of nodes, including an own node, an upstream node and a downstream node connected in series via a ring line, the own node operatively connected to the upstream node and the downstream node and having a communication status, said system comprising:
  control pattern transmitting means for transmitting one of at least three control patterns to the downstream node, independently of the communication status of the other nodes, the at least three control patterns including:
    a first control pattern indicating that the communication status of the own node is normal,
    a second control pattern indicating the communication status of each of the own node and the upstream node is normal, and
    a third control pattern indicating an abnormality of at least one of the own node and the upstream node;
  control pattern receiving means for receiving the third control pattern transmitted from the upstream node as a received control pattern and for discriminating the received control pattern; and
  connection management control means for holding the communication status of the own node, changing the communication status in accordance with the received control pattern by said control pattern receiving means of the own node, and controlling said control pattern transmitting means of the own node in accordance with the change in the communication status.

14. A system as set forth in claim 13,
  wherein the third control pattern is transmitted from said control pattern transmitting means of the own node to the downstream node when one of the own node and the upstream node is abnormal, and when said control pattern receiving means discriminates that the received control pattern from the upstream node is the third control pattern.

15. A system as set forth in claim 13,
  wherein said control pattern transmitting means transmits the first control pattern to the downstream node, when the own node is normal and confirmation has not been received that the ring network as a whole has created an inherent connection status.

16. A system as set forth in claim 13,
  wherein the second control pattern is transmitted to the downstream node when the first control pattern is received, the second pattern is transmitted to the downstream node when the second control pattern is received, the second control pattern is repeatedly transmitted to the downstream node from the node which was abnormal but has been restored when the restored node receives the first control pattern from the upstream node.

17. A system as set forth in claim 13, wherein said connection management control means determines that the ring network as a whole has created an inherent connection status when the own node receives the second control patterns repeatedly transmitted.

18. A system as set forth in claim 13, wherein the ring network is operated as an analog signal mode network using at least three analog signals having different predetermined frequencies allotted to each of the control patterns.

19. A system as set forth in claim 13, wherein the ring network is operated as a digital signal mode network using at least three digital signals having different predetermined transmission codes allotted to each of the control patterns.

20. A communication node in a system for carrying out connection management of a ring network including connecting an upstream node and a downstream node thereto in series via a ring line, and having a communication status, comprising:
    a control pattern transmitting unit for transmitting one of at least three control patterns to the downstream node, independently of the communication status of the other nodes, the three control patterns including:
        a first control pattern indicating that the node communication status is normal,
        a second control pattern indicating that the node communication status and an upstream node communication status are normal, and
        a third control pattern indicating an abnormality of at least one of the node and the upstream node;
    a control pattern receiving unit for receiving the third control pattern transmitted from the upstream node and for discriminating the received, third control pattern; and
    a connection management control unit, operatively connected to said control pattern transmitting unit and said control pattern receiving unit, for holding a communication status of the node, for changing the communication status in accordance with the received control pattern by said control pattern receiving unit of the node, and for controlling said control pattern transmitting unit of the node in accordance with the change in the communication status,
    said control pattern transmitting unit transmitting the third control pattern to the downstream node when one of the node and the upstream node is abnormal, and when said control pattern receiving unit discriminates that the received control pattern from the upstream node is the fourth control pattern,
    said control pattern transmitting unit transmitting the first control pattern to the downstream node when the corresponding node is normal and confirmation has not been received that the ring network as a whole has created a connection status,
    said control pattern transmitting unit transmitting the second control pattern to the downstream node when the first control pattern is received, and transmitting the second control pattern repeatedly to the downstream node when the node which was abnormal but which has been restored receives the first control pattern from the upstream node,
    said connection management control unit determining that the ring network as a whole has created the connection status when the node receives the second control pattern repeatedly transmitted.

21. A node of a ring network, said node having a communication status and operatively connecting an upstream node and a downstream node, said node comprising:
    control pattern transmission means for transmitting one of a plurality of control patterns to the downstream node, independently of the communication status of other nodes in the ring network, the plurality of control patterns including:
        a first control pattern indicating the communication status of said node is normal,
        a second control pattern indicating the communication status of each of said node and the upstream node is normal, and
        a third control pattern indicating an abnormality of one of the node and the upstream node;
    control pattern reception means for receiving the third control pattern transmitted from the upstream node; and
    connection management control means, operatively connected to said control pattern transmission means and said control pattern reception means, for updating a current communication status based on the third control pattern received by said control pattern reception means and the current communication status to produce a next communication status, and for controlling said control pattern transmission means in accordance with the next communication status.

22. A method for carrying out connection management of a ring network including a plurality of nodes, each node having a communication status, each node operatively connected to an upstream node and a downstream node, said method comprising the steps of:
    (a) transmitting a first control pattern when a node is in a normal state;
    (b) transmitting a second control pattern when the node and the upstream node are normal;
    (c) transmitting a third control pattern when one of the node and the upstream node is abnormal;
    (d) receiving one of the first, second and third control patterns transmitted from the upstream node; and
    (e) updating the current communication status of the node and selecting one of said steps (a), (b) and (c) in response to the control pattern received in said step (d).

23. A method as set forth in claim 22, wherein said updating in step (e) updates the current communication status to a communication enable status when at least two upstream nodes are in a normal status.

* * * * *

UNITED STATES PATENT AND TRADEMARK OFFICE
CERTIFICATE OF CORRECTION

PATENT NO. : 5,404,134
DATED : April 4, 1995
INVENTOR(S) : Akira JINZAKI et al.

It is certified that error appears in the above-indentified patent and that said Letters Patent is hereby corrected as shown below:

Col. 2, line 24, after "However" insert --,--.

Col. 7, lines 31-32, change "segmential" to --sequential--; and line 54, change "transmissions" to --transmission--.

Signed and Sealed this

Twentieth Day of June, 1995

Attest:

BRUCE LEHMAN

Attesting Officer     Commissioner of Patents and Trademarks